No. 746,334. PATENTED DEC. 8, 1903.
R. B. JACKSON & J. SHARP, Jr.
RAZOR STROP.
APPLICATION FILED JAN. 5, 1903.
NO MODEL.
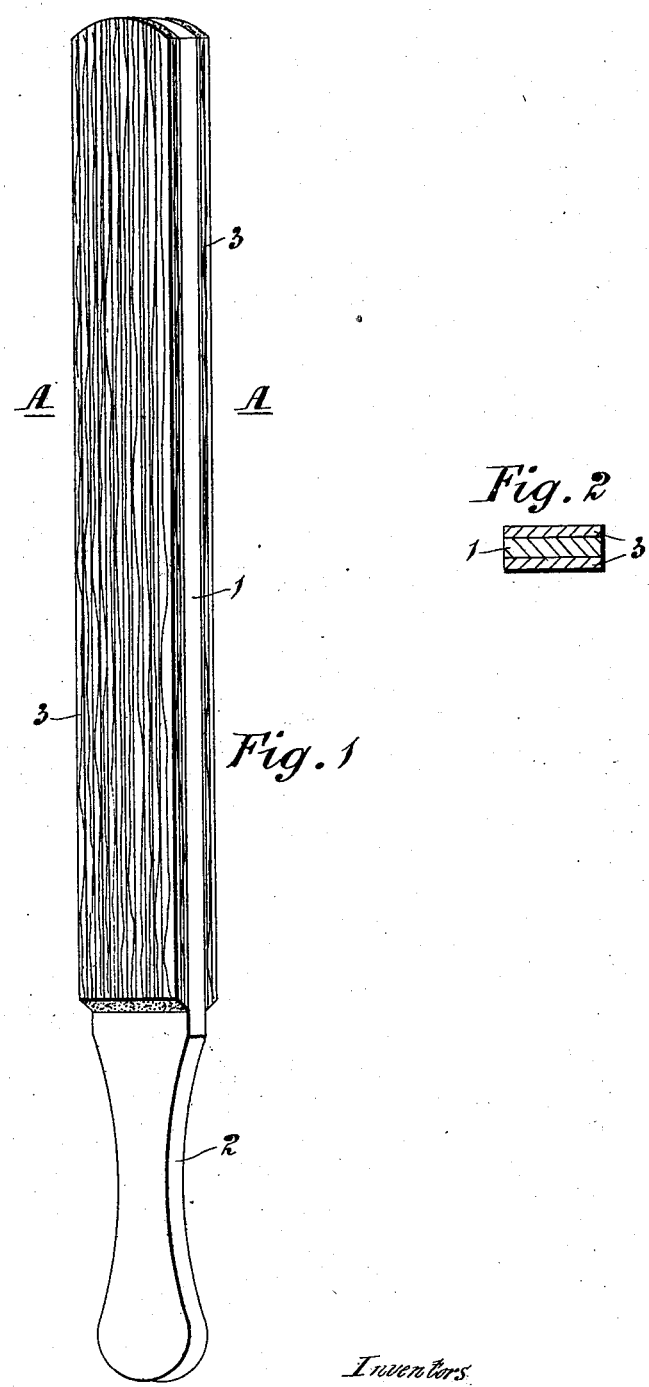

No. 746,334. Patented December 8, 1903.

UNITED STATES PATENT OFFICE.

RALPH BENJAMIN JACKSON AND JOHN SHARP, JR., OF NELSON, NEW ZEALAND.

RAZOR-STROP.

SPECIFICATION forming part of Letters Patent No. 746,334, dated December 8, 1903.

Application filed January 5, 1903. Serial No. 137,896. (No model.)

*To all whom it may concern:*

Be it known that we, RALPH BENJAMIN JACKSON, residing at Examiner Road, and JOHN SHARP, Jr., residing at Milton street, Nelson, in the Provincial District of Nelson, in the Colony of New Zealand, subjects of His Majesty the King of Great Britain and Ireland, have invented a new and Improved Razor-Strop, of which the following is a specification.

This invention provides an improved strop upon which razors and similar edged implements may be sharpened.

Referring to the drawings accompanying this specification, Figure 1 is a perspective view of the strop; and Fig. 2, a cross-section of the same on line A A, Fig. 1.

The blade 1 is made of wood, by preference, and is shaped into a handle 2 for holding the strop while sharpening a razor thereon.

3 represents strips of the flower-stalk of *Phormium tenax*, which must be obtained before the plant comes into flower to get the best results. The heart of the flower-stalk only is used, though an inferior strop may be made from the outer part of the stalks. The efficacy of the strop results from so cutting the stalks that the fibers lie longitudinally along the blade, and the surface is flattened by planing, so that the fibers are not destroyed or damaged.

The strips 3 are glued to the blade 1 and the whole afterward finished by planing and surfacing with glass-paper. The handle 2 is polished or varnished to give a finished appearance.

What we claim as our invention, and desire to secure by Letters Patent, is—

A razor-strop consisting of a blade having one end formed into a handle, and strips cut from the flower-stalk of *Phormium tenax* secured upon said blade, the strips having a surface upon which a razor may be sharpened and being secured to the blade with their fibers disposed longitudinally thereto.

In witness whereof we have hereunto set our hands in the presence of two witnesses.

RALPH BENJAMIN JACKSON.
JOHN SHARP, JUNIOR.

Witnesses:
E. J. ANSTISS,
E. S. BALDWIN.